(12) United States Patent
Rugger

(10) Patent No.: US 8,400,070 B2
(45) Date of Patent: Mar. 19, 2013

(54) ELECTRONIC BALLAST AND METHOD FOR OPERATING AT LEAST ONE DISCHARGE LAMP

(75) Inventor: Federico Rugger, Munich (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 254 days.

(21) Appl. No.: 12/671,223

(22) PCT Filed: Jul. 30, 2007

(86) PCT No.: PCT/EP2007/057844
§ 371 (c)(1),
(2), (4) Date: Jan. 29, 2010

(87) PCT Pub. No.: WO2009/015687
PCT Pub. Date: Feb. 5, 2009

(65) Prior Publication Data
US 2010/0188021 A1    Jul. 29, 2010

(51) Int. Cl.
H05B 37/02 (2006.01)
(52) U.S. Cl. ......... 315/247; 315/194; 315/307; 315/308
(58) Field of Classification Search .................. 315/247, 315/194, 199, 307, 308, 291, DIG. 2, DIG. 5
See application file for complete search history.

(56) References Cited

U.S. PATENT DOCUMENTS

| | | | |
|---|---|---|---|
| 6,075,326 A * | 6/2000 | Nostwick | 315/307 |
| 6,154,381 A | 11/2000 | Kajouke et al. | |
| 6,791,279 B1 * | 9/2004 | Shearer et al. | 315/209 R |
| 6,933,684 B2 | 8/2005 | Yang et al. | |
| 2003/0161167 A1 | 8/2003 | Barnett et al. | |
| 2004/0251852 A1 * | 12/2004 | Kambara et al. | 315/291 |

FOREIGN PATENT DOCUMENTS

| | | |
|---|---|---|
| CN | 2538115 Y | 2/2003 |
| EP | 1583402 A1 | 10/2005 |

OTHER PUBLICATIONS

English language abstract for EP 1583402 A1, Oct. 5, 2005.
International Search Report of PCT/EP2007/057844 mailed Apr. 15, 2008.
Moo et al., "Parallel Operation of Modular Power Factor Correction Circuits"; IEEE Transactions on Power Electronics, vol. 17, No. 3, May 2002, pp. 398-404.
Newton et al., "AC/DC Power Factor Correction Using Interleaved Boost & Cúk Converters", Power Electronics and Variable Speed Drives, Sep. 18-19, 2000, Conference Publication No. 475, Imperial College, UK, Harland Simon, Plc, UK; pp. 293-298.

* cited by examiner

Primary Examiner — David H Vu

(57) ABSTRACT

An electronic ballast is provided, including first a second input connections for connecting an alternating supply voltage; an EMC filter; a rectifier; a capacitor for providing the DC operating voltage for the output stage; and a power factor correction device, which comprises a number n of partial devices for power factor correction, as well as a control device for controlling the number n of partial devices, the power to be provided at the output of the power factor correction device being a total power currently to be provided, the power to be provided by the partial device i being a currently to be provided partial power of the partial device i. The control device is configured to control at least first and second partial devices as a function of the currently to be provided total power in such that their currently to be provided partial powers differ from one another.

15 Claims, 5 Drawing Sheets

| $P_{Ges}$ | PA $f_{PFC}$ | Inv. $f_{PFC}$ |
|---|---|---|
| W | kHz | kHz |
| 60 | 373 | 124 |
| 120 | 186 | 62 |
| 120 | 186 | 124 |
| 240 | 93 | 62 |
| 240 | 93 | 93 |
| 300 | 74.6 | 74.6 |

| $P_{Ges}$ | PA $f_{PFC}$ | Inv. $f_{PFC}$ |
|---|---|---|
| W | kHz | kHz |
| 60 | 373 | 124 |
| 100 | 186 | 74,6 |
| 100 | 186 | 149,1 |
| 200 | 112 | 74,6 |
| 200 | 112 | 112 |
| 300 | 74,6 | 74,6 |

| line | $P_{teil}$ W | $U_{netz}$ Vrms | $I_{netz}$ Arms | $I_{netz,max}$ A | $U_{rail}$ V | $I_{L,max}$ A | L mH | $T_{on}$ uS | $T_{off}$ uS | $f_{PFC}$ kHz | $P_{Ges}$ | PFC stage in operation |
|---|---|---|---|---|---|---|---|---|---|---|---|---|
| 1 | 100 | 230 | 0.43 | 0.61 | 420 | 1.23 | 0.8 | 3.02 | 10.39 | 74.6 | 300 W | 3 |
| 2 | 80 | 230 | 0.35 | 0.49 | 420 | 0.98 | 0.8 | 2.42 | 8.31 | 93.2 | 240 W | 3 |
| 3 | 40 | 230 | 0.17 | 0.25 | 420 | 0.49 | 0.8 | 1.21 | 4.15 | 186.4 | 120 W | 3 |
| 4 | 20 | 230 | 0.09 | 0.12 | 420 | 0.25 | 0.8 | 0.60 | 2.08 | 372.9 | 60 W | 3 |

| line | $P_{teil}$ W | $U_{netz}$ Vrms | $I_{netz}$ Arms | $I_{netz}^{max}$ A | $U_{rail}$ V | $i_{L,max}$ A | L mH | $T_{on}$ uS | $T_{off}$ uS | $f_{PFC}$ kHz | $P_{Ges}$ | PFC stage in operation |
|---|---|---|---|---|---|---|---|---|---|---|---|---|
| 1 | 100 | 230 | 0.43 | 0.61 | 420 | 1.23 | 0.8 | 3.02 | 10.39 | 74.6 | 300 W | 3 |
| 2 | 80 | 230 | 0.35 | 0.49 | 420 | 0.98 | 0.8 | 2.42 | 8.31 | 93.2 | 240 W | 3 |
| 3 | 120 | 230 | 0.52 | 0.74 | 420 | 1.48 | 0.8 | 3.63 | 12.46 | 62.1 | 240 W | 2 |
| 4 | 60 | 230 | 0.26 | 0.37 | 420 | 0.74 | 0.8 | 1.81 | 6.23 | 124.3 | 120 W | 2 |
| 5 | 120 | 230 | 0.52 | 0.74 | 420 | 1.48 | 0.8 | 3.63 | 12.46 | 62.1 | 120 W | 1 |
| 6 | 60 | 230 | 0.26 | 0.37 | 420 | 0.74 | 0.8 | 1.81 | 6.23 | 124.3 | 60 W | 1 |

FIG 6

| line | $P_{teil}$ W | $U_{netz}$ Vrms | $I_{netz}$ Arms | $I_{netz}^{max}$ A | $U_{rail}$ V | $i_{L,max}$ A | L mH | $T_{on}$ uS | $T_{off}$ uS | $f_{PFC}$ kHz | $P_{Ges}$ | PFC stage in operation |
|---|---|---|---|---|---|---|---|---|---|---|---|---|
| 1 | 100 | 230 | 0.43 | 0.61 | 420 | 1.23 | 0.8 | 3.02 | 10.39 | 74.6 | 300 W | 3 |
| 2 | 66.6 | 230 | 0.29 | 0.41 | 420 | 0.82 | 0.8 | 2.01 | 6.92 | 112.0 | 200 W | 3 |
| 3 | 100 | 230 | 0.43 | 0.61 | 420 | 1.23 | 0.8 | 3.02 | 10.39 | 74.8 | 200 W | 2 |
| 4 | 50 | 230 | 0.22 | 0.31 | 420 | 0.74 | 0.8 | 1.81 | 6.23 | 124.3 | 120 W | 2 |
| 5 | 100 | 230 | 0.43 | 0.61 | 420 | 1.23 | 0.8 | 3.02 | 10.38 | 74.6 | 100 W | 1 |
| 6 | 60 | 230 | 0.26 | 0.37 | 420 | 0.74 | 0.8 | 1.81 | 6.23 | 124.3 | 120 W | 1 |

ELECTRONIC BALLAST AND METHOD FOR OPERATING AT LEAST ONE DISCHARGE LAMP

RELATED APPLICATIONS

The present application is a national stage entry according to 35 U.S.C. §371 of PCT application No.: PCT/EP2007/057844 filed on Jul. 30, 2007.

TECHNICAL FIELD

Various embodiments relate to an electronic ballast for operating at least one discharge lamp, including an input stage and an output stage, the output stage having a first output connection and a second output connection for connecting the at least one discharge lamp, as well as a control input for varying the output power provided between the first output connection and the second output connection, the input stage being configured to provide at its output a DC operating voltage for the output stage, and including the following: a first input connection and a second input connection for connecting an alternating supply voltage; an EMC filter (EMC=electromagnetic compatibility), a rectifier, the EMC filter being coupled between the first input connection and the second input connection and the rectifier; a capacitor for providing the DC operating voltage for the output stage; and a power factor correction device that is coupled between the rectifier and the capacitor, the power factor correction device including a number n of partial devices for power factor correction that are interconnected in parallel, as well as a control device for controlling the number n of partial devices, the power to be provided at the output of the power factor correction device being a total power currently to be provided, the power to be provided by the partial device i being a currently to be provided partial power of the partial device i. Furthermore, it relates to a method for operating at least one discharge lamp on such an electronic ballast.

BACKGROUND

Various embodiments relate to dimmable electronic ballasts, that is to say electronic ballasts that can be controlled in such a way that the total power provided by them can be varied in a wide range. For example, an electronic ballast that is configured for a maximum power to be provided of 300 W provides a total power of 180 W at 60%, and of approximately 60 W at 20%.

FIG. 4 carries the variation in the switching frequency $f_{PFC}$ (PFC=power factor correction) of, for example, three parallel connected PFC stages of a generic electronic ballast as a function of the partial power to be provided by each PFC stage. Thus, given a provided total power $P_{Ges}$ of 300 W, that is to say each PFC stage provides 100 W, the switching frequency $f_{PFC}$ is 74.6 kHz. Given a total power to be provided of 240 W, that is to say each PFC stage provides a partial power of 80 W, the switching frequency $f_{PFC}$ is 93.2 kHz. Given a total power to be provided of 120 W, that is to say each PFC stage provides a partial power of 40 W, the switching frequency $f_{PFC}$ already rises to a considerable 186 kHz. Finally, the switching frequency $f_{PFC}$ even increases to 372.9 kHz given a total power to be provided of 60 W, that is to say each PFC stage provides 20 W.

The following, further parameters that are reproduced in FIG. 4 relate to the following variables: $U_{netz}$ is the rms value of the alternating supply voltage connected between the two input connections. $I_{netz}$ is the rms value of the current flowing via the input connections. $I_{netz}^{max}$ is the maximum value of the current flowing via the input connections $U_{rail}$ is the DC operating voltage provided at the output of the rectifier. The middle block of FIG. 4 reproduces variables that relate to the PFC stages, that is to say the partial devices for the power factor correction. Thus, L is the quantity of the inductor used in a PFC stage. $I_{L,max}$ is the maximum current flowing through this inductor. $T_{on}$ is the switch on time of the switch of a PFC stage, $T_{off}$ is the switch off time of the switch of a PFC stage. Finally, the last column of FIG. 4 specifies how many PFC stages are simultaneously in operation in order to attain the respective provided total power.

In order to be able to satisfy the EMC standard decisive for electronic ballasts, presently EN55015, it is required to design the EMC filter such that it is effective for the entire power range, that is to say for a very wide range of the switching frequency $f_{PFC}$. There is a consequential increase in the complexity and costs of the EMC filter. Moreover, the switching frequency $f_{PFC}$ increases considerably for very small total powers that are to be provided, such that in this case the efficiency of the power factor correction device decreases markedly in an undesired way.

SUMMARY

Various embodiments further develop a generic ballast and/or a generic method in such a way that the use of a cost effective EMC filter is enabled.

The present invention is based on the finding that this object can be achieved when the control device is designed to control at least a first and a second partial device as a function of the currently to be provided total power in such a way that their currently to be provided partial powers differ from one another. This basic idea opens up various possibilities of implementation, and without anticipating the following description of preferred embodiments mention is to be made, in particular, of two preferred possibilities which consist in completely turning off at least one of the partial devices, or dimensioning different partial devices for different partial powers to be provided. It can thereby be ensured in any case that the respective partial devices can always be operated near their optimum operating point with reference to the switching frequency $f_{PFC}$ and the partial power to be provided. On the one hand, this enables a more favorable design of the EMC filter, since the switching frequency of the partial devices remains within a markedly narrower range. Furthermore, because of the operation near its respectively optimum operating point, the efficiency of the power factor correction device is improved in the case of dimmed operation.

In a preferred embodiment, the control device is designed to control the partial devices as a function of the currently to be provided total power in such a way that only a number m of partial devices are activated in order to provide the currently to be provided total power, it holding true that m≦(n−1), and n expressing the number of all the partial devices. As already mentioned, this opens up the possibility of operating each partial device near its optimum operating point. It is thereby possible to keep the switching frequency $f_{PFC}$ to low values.

The total power currently to be provided by the power factor correction device is preferably determined by evaluating an analog or digital control signal, in particular a dimming signal. Particular mention is to be made here of the so called DALI signal. Consequently, such a signal, which is usually coupled to the output stage in order, in particular, to be evaluated there for the purpose of controlling the switches of the inverter, is also fed to the control device that controls the partial devices of the power factor correction device.

Alternatively, the total power currently to be provided by the power factor correction device can be determined by evaluating electrical variables determined in the electronic ballast, in particular by evaluating current and voltage at the input of the power factor correction device, by evaluating current and voltage at the output of the power factor correction device, and/or by evaluating current and voltage at the output of the output stage. It is particularly advantageous here that such electrical variables can be determined in any case for other control purposes in the electronic ballast. These can therefore also be used without a large outlay for the purpose of determining the total power currently to be provided by the power factor correction device.

The partial powers of the partial devices can be assigned a phase shift at the beginning of a half wave of the current flowing via the first input connection. The control device is then designed with particular preference to vary the phase shift between the active partial devices as a function of the currently to be provided total power and/or of the number of the active partial devices. For example, if the power factor correction device includes three partial devices that output the same partial power and are operated with a phase shift of 120°, after one of these partial devices has been turned off the phase shift is set between the two remaining partial devices to 180°. If the partial devices are designed for different partial powers to be provided, other phase shifts than 360° divided by the number of the active partial devices can be advantageous.

A particularly preferred embodiment is distinguished in that the control device is configured to control at least two active partial devices such that the latter provide different current partial powers. For example, in the case of a power factor correction device that include three partial devices, it can be provided that the partial devices divide up the total power to be provided between themselves into 50%, 30% and 20%. Since at least only one partial device is operated in this case to provide a low partial power, it is possible hereby to keep the efficiency of the power factor correction device at a high level overall.

Alternatively or in addition, depending on the number of the partial devices present, the control device can furthermore be configured to control at least two active partial devices such that the latter provide equal current partial powers. The total power to be provided can, for example, already be divided up into 40%, 40%, 20% in the case of three partial devices. It is also possible hereby to attain a higher efficiency of the power factor correction device than in the case of the mode of procedure known from the prior art.

Furthermore, it is preferred when one partial device is designed for a maximum current partial power, the operating point for switching off a first or further partial device being selected as follows in the case of a reduction in the currently to be provided total power: (currently to be provided total power)/(number of active partial devices−1)=factor A*(maximum current partial power), it holding true for the factor A that: $0.8<=A<=1$. Thus, one of the active partial devices is turned off when in the event of a drop-by dimming the total power to be provided drops so far that it is possible by turning off a first or further partial device to operate the remaining partial devices in a range between 80 and 100% of their maximum current partial powers.

By contrast, it can be provided that when one partial device is designed for a maximum current partial power the operating point for switching on a further partial device is selected as follows in the case of an increase in the currently to be provided total power:
(currently to be provided total power)/(number of active partial devices)=factor B*(maximum current partial power), it holding true for the factor B that: $0.8<=B<=1$. Thus, when for a currently to be provided total power the active partial devices are operated in the range from 80 to 100% of their maximum current partial power, a further partial device is activated given a further increase in the currently to be provided total power. A continuous turning on and off of partial devices can be prevented by appropriately selected hystereses.

The two last named measures ensure that the respective partial devices are always operated in the range for which they are designed. On the other hand optimum turning off and/or on of a partial device is fixed such that the power factor correction device is always operated with as optimum an efficiency as possible and in a range that is distinguished by as low a switching frequency $f_{PFC}$ as possible.

Furthermore, it is preferred when it holds for the maximum total power to be provided that: maximum total power to be provided=factor C*(sum of the maximum partial powers to be provided), it holding true for the factor C that: $0.8<=C<=1$.

Each partial device preferably includes an electronic switch, the control device being configured to operate the partial devices in discontinuous mode, the control device being configured to vary the switch on time of the electronic switch as a function of the currently to be provided total power. This measure constitutes a possibility, which is particularly easy to implement, of realizing the basic idea of the present invention without a large outlay. In this case, the partial devices can be configured identically for the purpose of simplicity, a partial device being turned off and/or the partial device being operated for the purpose of providing different partial powers only by driving the switch of each partial device differently.

In this case, the control device can, in particular, be configured to deactivate a partial device when the switch on time of one or each electronic switch has dropped below a prescribable threshold. This can be implemented particularly easily by a micro-processor, use being made of a register to determine the switch on time. The content of the register can be compared very easily with a prescribable threshold stored in a further register.

The control device can correspondingly be designed to activate a further partial device when the switch on time of one or each electronic switch has risen above a prescribable threshold.

The preferred embodiments, presented above with reference to an inventive electronic ballast, and their advantages are valid correspondingly, to the extent that they can be applied, for the inventive method.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows various electrical variables for a generic electronic ballast known from the prior art; and FIGS. 5 and 6 show the corresponding electrical variables for the first and second exemplary embodiments of an inventive electronic ballast.

DETAILED DESCRIPTION

The following detailed description refers to the accompanying drawings that show, by way of illustration, specific details and embodiments in which the invention may be practiced.

Figure 1:
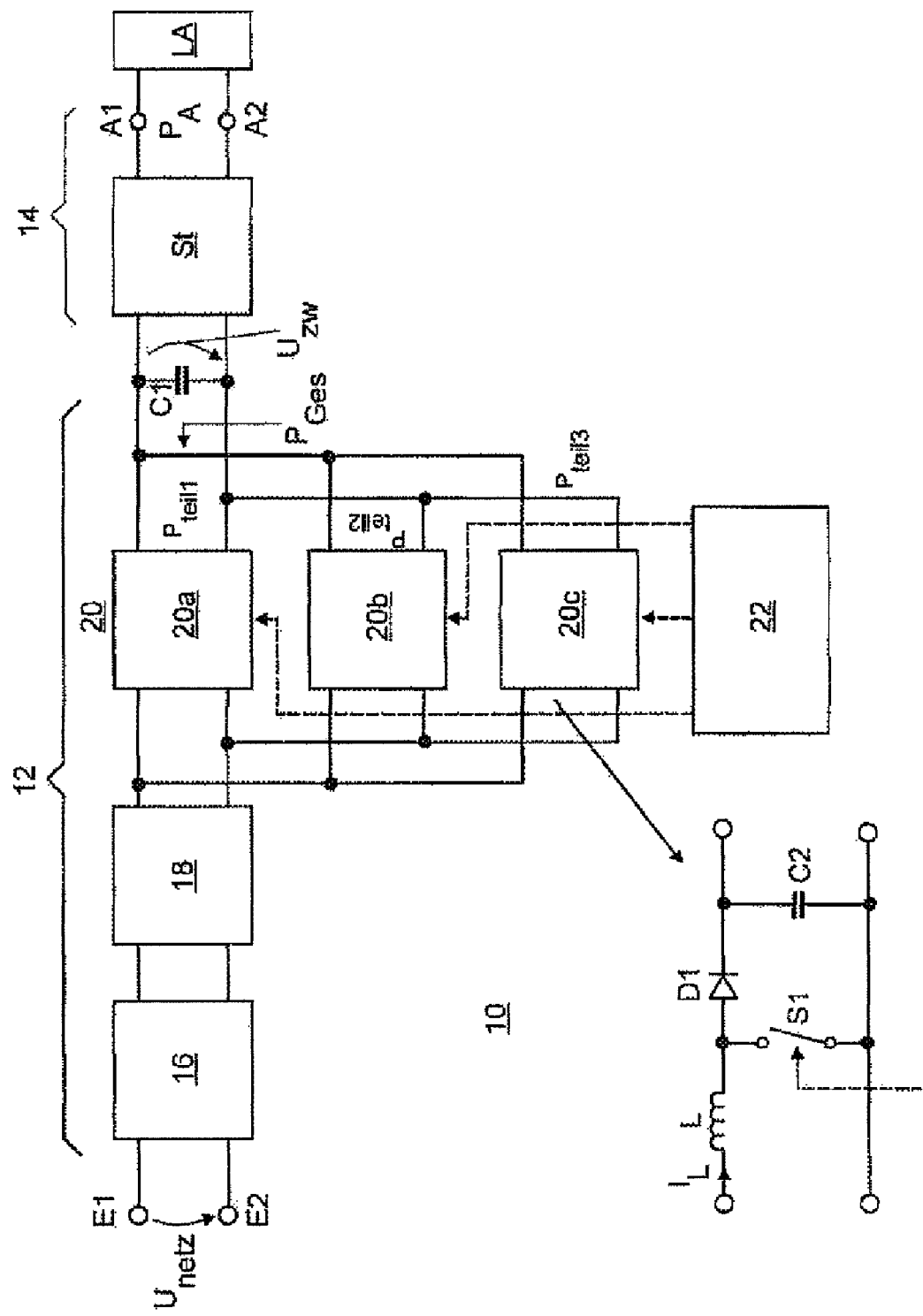
FIG. 1 is a schematic of the design of an exemplary embodiment of an inventive electronic ballast.

FIG. 1 is a schematic of the design of an exemplary embodiment of an inventive electronic ballast 10. It includes an input stage 12 and an output stage 14. The output stage 14 includes a multiplicity of electronic components (not illustrated), including, in particular, an inverter and a lamp inductor. It further includes a first output connection A1 and a second output connection A2 for connecting a discharge lamp LA. The input stage 12 includes a first input connection E1 and a second input connection E2 between which the alternating supply voltage $U_{netz}$, in particular the line voltage, can be connected. Following next is an EMC filter 16 to which a rectifier device 18 is connected. Following thereupon is a power factor correction device 20 that in the present case includes three parallel connected PFC stages 20a to 20c that are controlled via a control device 22. A partial power $P_{teil1}$ to $P_{teil3}$ is provided at the output of each partial device. Provided at the output of the power factor correction device 20 is a total power $P_{Ges}$ that is formed from the sum of the partial powers $P_{teil1}$ to $P_{teil3}$ in provided by the partial devices 20a to 20c. Capacitor C1 provided at the output of the power factor correction device 20 provides the so called intermediate circuit voltage $U_{ZW}$ as DC operating voltage at the output stage 4. The output stage 14 has a control input St optionally varying the output power $P_A$ provided between the first output connection A1 and the second output connection A2. Also illustrated, by way of example, is the design of a partial device 20c, other embodiments of PFC stages likewise being suitable straightaway for applying the present invention. In the present exemplary embodiment, a PFC stage includes a PFC inductor L through which the current $I_L$ flows. It includes a switch S1, which is controlled by the control 22, as well as a diode D1 and a capacitor C2.

Specified in FIG. 5 for a first exemplary embodiment of an inventive electronic ballast are a multiplicity of electrical variables that correspond to those which have already been introduced in conjunction with FIG. 4. In this exemplary embodiment, the partial devices 20a to 20c are designed for a maximum partial power to be provided of $P_{teili}$ of 120 W. All three PFC stages are operated in order to provide a total power $P_{Ges}$ of 300 W, the power provided by each PFC stage being 100 W, see line one of FIG. 5. In accordance with line two, as in the prior art all three PFC stages are operated in order to provide a total power $P_{Ges}$ of 240 W such that each PFC stage provides a partial power of 80 W. The switching frequencies $f_{PFC}$ in accordance with the first and second lines of FIG. 5 therefore correspond to the switching frequencies $f_{PFC}$ of the first and second lines of FIG. 4. In accordance with line three of FIG. 5, one PFC stage is now turned off in order to provide a total power of 240 W, that is to say only two PFC stages continue in operation, respectively providing a partial power $P_{teil}$ of 120 W. Whereas during operation of three PFC stages the phase shift of the currents through the respective PFC inductor L are mutually offset by 120°, during operation of two partial devices this phase shift is 180° and is set by the control device 22 by appropriate control. As is to be gathered from line 3 of FIG. 5, the switching frequency $f_{PFC}$ drops to 62.1 kHz. In accordance with line four, in order to provide a total power $P_{Ges}$ of 120 W, a switching frequency $f_{PFC}$ of 124.3 kHz is reached during activation of two PFC stages that respectively provide a partial power of 60 W. If a total power $P_{Ges}$ of 120 W is provided by operating a single PFC stage—see line five of FIG. 5—, the switching frequency $f_{PFC}$ drops to 62.1 kHz. When a total power $P_{Ges}$ of 60 W was provided during operation of three PFC stages, in comparison herewith the switching frequency $f_{PFC}$ was 186.4 kHz in accordance with line three of FIG. 4, and thus approximately three times more.

In order to provide a total power $P_{Ges}$ of 60 W and operation of only one PFC stage, in accordance with line six of FIG. 5 it is possible to reach a switching frequency $f_{PFC}$ of 124.3 kHz.

A switching frequency $f_{PFC}$ of 372 kHz is required when providing the same total power $P_{Ges}$ during operation of three PFC stages in accordance with line four of FIG. 4.

Figures 2A, 2B:
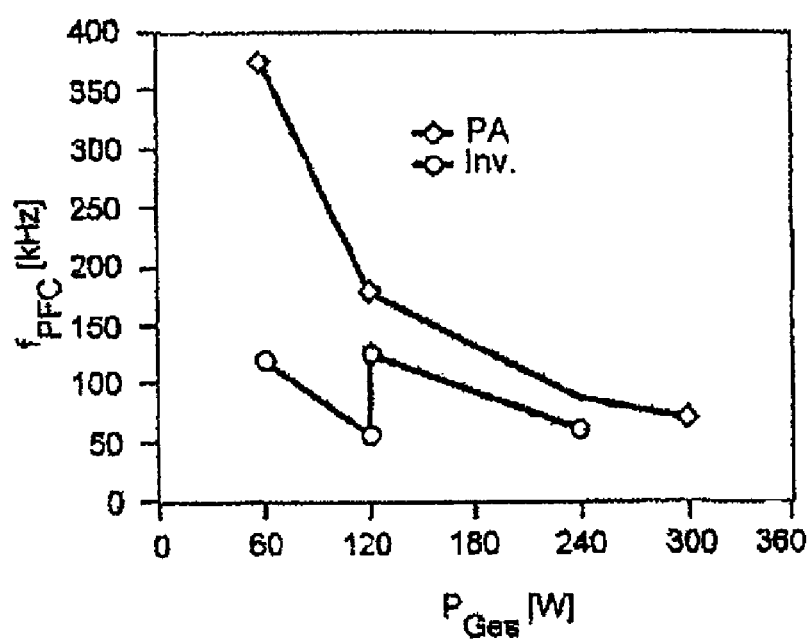
FIGS. 2A and 2B show comparisons of the switching frequency $f_{PFC}$ against the total power to be provided for a first exemplary embodiment of the invention and for the prior art.

For the purpose of illustration, FIG. 2B shows the profile of the switching frequency $f_{PFC}$ against the total power to be provided $P_{Ges}$, for the first exemplary embodiment (dashed line) and the associated prior art (solid line). The corresponding total powers $P_{Ges}$ and switching frequencies $f_{PFC}$ are given in FIG. 2A.

FIG. 2B illustrates how greatly the switching frequency $f_{PFC}$ rises in the case of small total powers $P_{Ges}$ to be provided in the case of the prior art, whereas it is only at most 124 kHz in the present exemplary embodiment. Since the lowest switching frequency $f_{PFC}$ is still approximately 60 kHz for the present invention, the result is a small bandwidth of the required switching frequencies $f_{PFC}$ and this results in an extremely simple, and thereby cost effective design of the EMC filter 16.

The partial devices 20a to 20c, that is to say the individual PFC stages for providing a maximum partial power of 100 W are set out in the exemplary embodiment in accordance with FIG. 6. In order to provide a total power $P_{Ges}$ of 300 W all three PFC stages are in operation, each PFC stage providing a partial power of 100 W—see line one of FIG. 6. When a total power $P_{Ges}$ of 200 W is provided and all three PFC stages are operated in accordance with line two of FIG. 6, the result is a switching frequency $f_{PFC}$ of 112.0 kHz. If the same total power $P_{Ges}$ of 200 W is provided by activating only two PFC stages, of which each contributes 100 W—see line three of FIG. 6—, the result is a switching frequency $f_{PFC}$ of only 74.6 kHz.

Providing a total power $P_{Ges}$ of 100 by operating two PFC stages in such a way that each PFC stage contributes a partial power of 50 W produces a switching frequency $f_{PFC}$ of 149.1 kHz. If the same total power $P_{Ges}$ is provided by activating only one PFC stage—see line five of FIG. 6—, the result is a switching frequency $f_{PFC}$ of only 74.6 kHz. A switching frequency $f_{PFC}$ of 124.3 kHz—see line 6 of FIG. 6—results for providing a total power $P_{Ges}$ of 60 W by activating only one PFC stage.

Figures 3A, 3B:
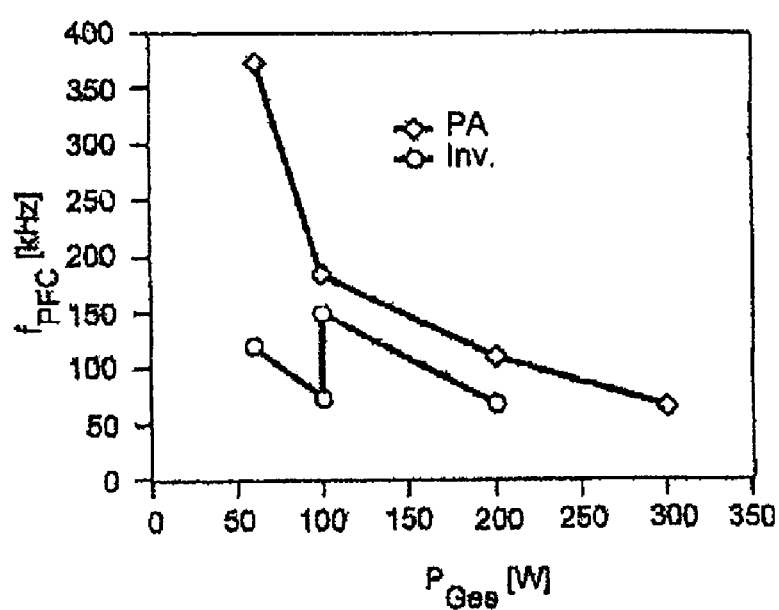
FIGS. 3A and 3B show comparisons of the switching frequency $f_{PFC}$ against the total power to be provided for a second exemplary embodiment of the invention and the prior art.

FIG. 3B shows a comparison of the profile of the switching frequency $f_{PFC}$ against the total power $P_{Ges}$ provided for the second exemplary embodiment (dashed line) and the corresponding prior art (solid line). FIG. 3A gives the associated values of the switching frequency $f_{PFC}$ and of the total power $P_{Ges}$ to be provided. It is clearly to be seen once again that in the prior art the switching frequency $F_{PFC}$ rises steeply given small total powers $P_{Ges}$, while in the case of the second exemplary embodiment it lies in a window between approximately 75 and 150 kHz. This window is certainly slightly wider than in the case of the first exemplary embodiment, but the second exemplary embodiment is already enabled by a more cost effective design of the individual PFC stages, that is to say in the first exemplary embodiment the individual PFC stages are designed for providing a partial power of 120 W, while for the individual PFC stages a design of 100 W suffices in the second exemplary embodiment.

In the exemplary embodiments illustrated, the power provided by the respective PFC stage is effected by varying the switch on time $T_{on}$ and the switch off time $T_{off}$ of the switches of the individual PFC stages. Independently of the two exemplary embodiments illustrated, the present invention also covers dimensioning the partial devices for different partial powers, or controlling identical partial devices for the purpose of providing different partial powers by means of the control device 22, in particular by varying the switch on and switch off times of the respective switch S1. Given a reduction in the total power $P_{Ges}$, a partial device is preferably turned off whenever it transpires that after a partial device has been turned off the remaining partial devices can be operated with a partial power that is approximately 80 to 100l of its maximum partial power to be provided. Conversely in a total power $P_{Ges}$ to be provided that is increasing a partial device is switched on when it transpires that after the partial device is switched on the partial devices then activated have to provide between 80 and 100l of its maximum current partial power.

The total power currently to be provided by the power factor correction device can be determined by evaluating a signal applied to the control input St, and also by evaluating electrical variables determined in the electronic ballast, consideration being given here, in particular, to the current and the voltage at the input of the power factor correction device 20, the current and the voltage at the output of the power factor correction device 20 and/or the current and the voltage at the output A1, A2 of the output stage 14.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An electronic ballast for operating at least one discharge lamp, comprising an input stage and an output stage, the output stage having a first output connection and a second output connection for connecting the at least one discharge lamp, as well as a control input for varying the output power provided between the first output connection and the second output connection, the input stage being configured to provide at its output a DC operating voltage for the output stage, and comprising the following:
   a first input connection and a second input connection for connecting an alternating supply voltage;
   an EMC filter;
   a rectifier, the EMC filter being coupled between the first input connection and the second input connection and the rectifier;
   a capacitor for providing the DC operating voltage for the output stage; and
   a power factor correction device that is coupled between the rectifier and the capacitor, the power factor correction device comprising a number n of partial devices for power factor correction that are interconnected in parallel, as well as a control device for controlling the number n of partial devices, the power to be provided at the output of the power factor correction device being a total power currently to be provided, the power to be provided by the partial device i being a currently to be provided partial power of the partial device i;
   wherein the control device is configured to control at least a first and a second partial device as a function of the currently to be provided total power in such a way that their currently to be provided partial powers differ from one another, and
   wherein one partial device is configured for a maximum current partial power, the operating point for switching off a first or further partial device being selected as follows in the case of a reduction in the currently to be provided total power:
   (currently to be provided total power)/(number of active partial devices−1)=factor A*(maximum current partial power), where 0.8<=A<1.

2. The electronic ballast as claimed in claim 1, wherein the control device is configured to control the partial devices as a function of the currently to be provided total power in such a way that only a number m of partial devices are activated in order to provide the currently to be provided total power, where m≦(n−1).

3. The electronic ballast as claimed in claim 2, wherein the electronic ballast is configured such that the total power currently to be provided by the power factor correction device is determined by evaluating a signal selected from a group consisting of an analog control signal and a digital control signal.

4. The electronic ballast as claimed in claim 2, wherein the electronic ballast is configured such that the total power currently to be provided by the power factor correction device is determined by at least one of evaluating electrical variables determined in the electronic ballast; evaluating current and voltage at the output of the power factor correction device; and evaluating current and voltage at the output of the output stage.

5. The electronic ballast as claimed in claim 1, wherein the partial powers of the partial devices are assigned a phase shift at the beginning of a half wave of the current flowing via the first input connection, the control device being configured to vary the phase shift between the active partial devices as a function of at least one of the currently to be provided total power and of the number of the active partial devices.

6. The electronic ballast as claimed in claim 1, wherein the control device is configured to control at least two active partial devices such that the latter provide different current partial powers.

7. The electronic ballast as claimed in claim 1, wherein the control device is configured to control at least two active partial devices such that the latter provide equal current partial powers.

8. The electronic ballast as claimed in claim 1, wherein one partial device is configured for a maximum current partial power, the operating point for switching on a further partial device being selected as follows in the case of an increase in the currently to be provided total power:
   (currently to be provided total power)/(number of active partial devices)=factor B*(maximum current partial power), where 0.8<=B<=1.

9. The electronic ballast as claimed in claim 1, wherein it holds for the maximum total power to be provided that:
   maximum total power to be provided=factor C*sum of the maximum partial powers to be provided where 0.8<=C<=1.

10. The electronic ballast as claimed in claim 1, wherein each partial device comprises an electronic switch, the control device being configured to operate the partial devices in discontinuous mode, the control device being configured to vary the switch on time of the electronic switch as a function of the currently to be provided total power.

11. The electronic ballast as claimed in claim 10, wherein the control device is configured to deactivate a partial device when the switch on time of one or each electronic switch has dropped below a prescribable threshold.

12. The electronic ballast as claimed in claim 10, wherein the control device is designed to activate a further partial device when the switch on time of one or each electronic switch has risen above a prescribable threshold.

13. A method for operating at least one discharge lamp on an electronic ballast comprising an input stage and an output stage, the output stage having a first output connection and a second output connection for connecting the at least one discharge lamp, as well as a control input for varying the output power provided between the first output connection and the second output connection, the input stage being configured to provide at its output a DC operating voltage for the output stage, and comprising a first input connection and a second input connection for connecting an alternating supply voltage, as well as an EMC filter, a rectifier, the EMC filter being coupled between the first input connection and the second input connection and the rectifier, a capacitor for providing the DC operating voltage for the output stage, and a power factor correction device that is coupled between the rectifier and the capacitor, the power factor correction device comprising a number n of partial devices for power factor correction that are interconnected in parallel, as well as a control device for controlling the number n of partial devices, the power to be provided at the output of the power factor correction device being a total power currently to be provided, the power to be provided by the partial device i being a currently to be provided partial power of the partial device i;

the method comprising:
configuring one partial device for a maximum current partial power, the operating point for switching off a first or further partial device being selected as follows in the case of a reduction in the currently to be provided total power:
(currently to be provided total power)/(number of active partial devices−1)=factor A*(maximum current partial power), where $0.8<=A<=1$; and
controlling at least a first and a second partial device as a function of the currently to be provided total power in such a way that their currently to be provided partial powers differ from one another.

14. The electronic ballast as claimed in claim 3, wherein the electronic ballast is configured such that the total power currently to be provided by the power factor correction device is determined by evaluating a dimming signal.

15. The electronic ballast as claimed in claim 4, wherein the electronic ballast is configured such that the total power currently to be provided by the power factor correction device is determined by evaluating current and voltage at the input of the power factor correction device.

* * * * *